(12) United States Patent
Hashimoto

(10) Patent No.: US 6,322,471 B1
(45) Date of Patent: Nov. 27, 2001

(54) CHAIN GUIDE

(75) Inventor: Hiroshi Hashimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/518,822

(22) Filed: Mar. 6, 2000

(30) Foreign Application Priority Data

Mar. 5, 1999 (JP) .................................................. 11-059457

(51) Int. Cl.[7] ...................................................... F16H 7/08
(52) U.S. Cl. ........................... 474/140; 474/111; 474/101
(58) Field of Search ..................................... 474/110, 111, 474/101, 123, 140, 150, 131, 148, 273

(56) References Cited

U.S. PATENT DOCUMENTS

| | | | |
|---|---|---|---|
| 5,045,032 | * | 9/1991 | Suzuki et al. .......................... 474/140 |
| 5,184,983 | * | 2/1993 | Shimaya et al. .................. 474/140 X |
| 5,676,614 | * | 10/1997 | Inoue et al. ........................... 474/110 |
| 5,779,582 | | 7/1998 | Mott . |
| 5,813,935 | * | 9/1998 | Dembosky et al. .................. 474/111 |
| 5,820,502 | * | 10/1998 | Schulze ................................ 474/140 |

FOREIGN PATENT DOCUMENTS 6-144341 * 5/1994 (JP) ...................................... 474/140

* cited by examiner

Primary Examiner—Thomas R. Hannon
Assistant Examiner—Colby Hansen
(74) Attorney, Agent, or Firm—Dann, Dorfman, Herrell and Skillman, P.C.; Henry H. Skillman

(57) ABSTRACT

A chain guide includes an angle-like guide base having a single mounting portion bolted to a mount surface on the interior side of an endless chain and projecting to the exterior side of the chain through a space defined between the chain and the mount surface. A shoe supporting portion of the angle guide base projects perpendicularly from an exteriorly projecting end of the mounting portion and is provided with a plurality of nose locking projections spaced in a direction of travel of the chain. A guide shoe is provided with a plurality of generally hook-shaped resilient locking prongs projecting from a rear surface on a side opposite to a shoe surface. The locking prongs are snap-fitted with the locking projections to attach the guide shoe to the guide base with the shoe supporting portion held between the rear surface of the guide shoe and the locking prongs. The angle guide base is highly rigid and hence is able to suppress vibration and noises generated while the chain is running. The mounting portion of the guide base, which is disposed interiorly of the endless chain, does not increase the overall size of an apparatus to which the chain guide is mounted.

6 Claims, 6 Drawing Sheets

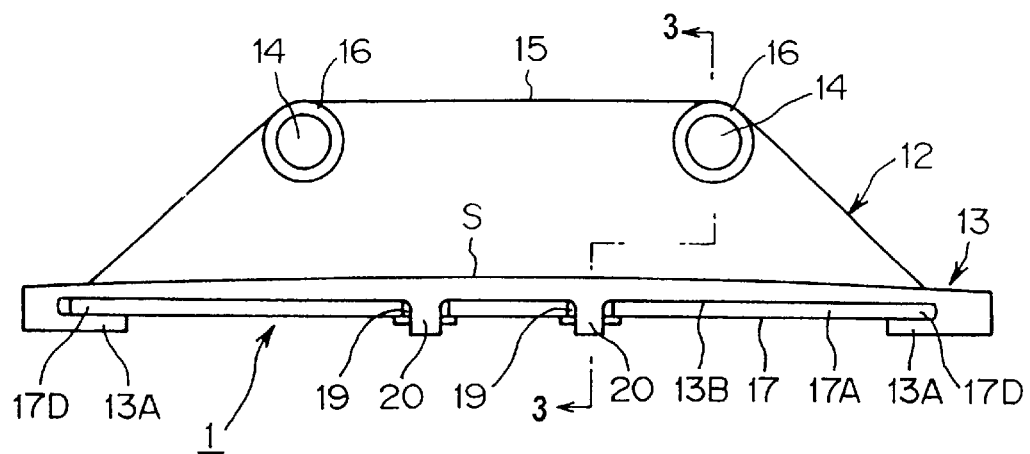
FIG. 2
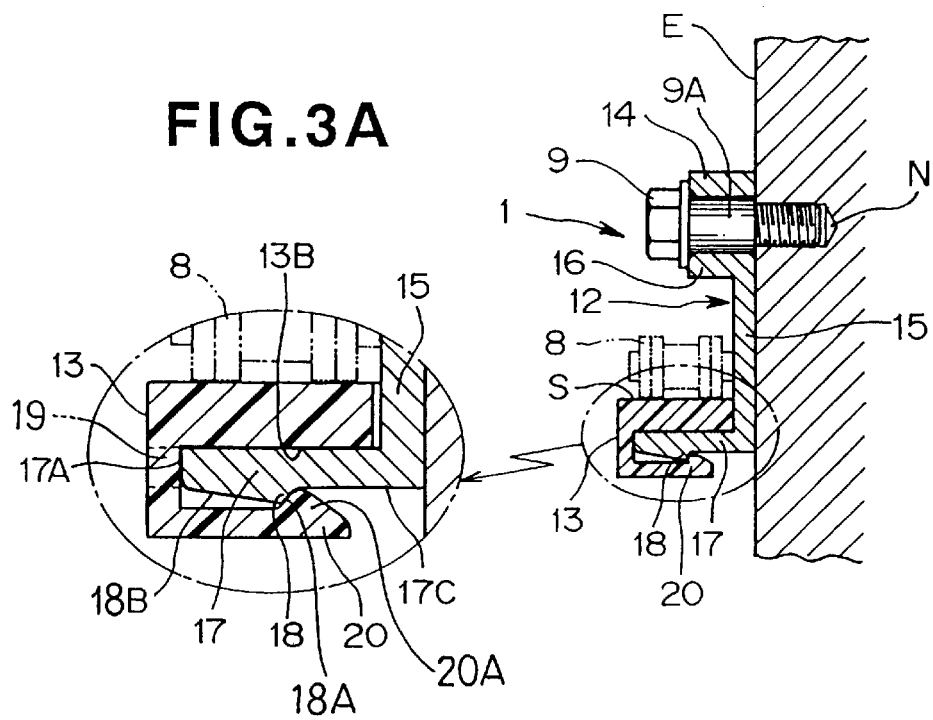
FIG. 3
FIG. 3A

FIG. 4
FIG. 5
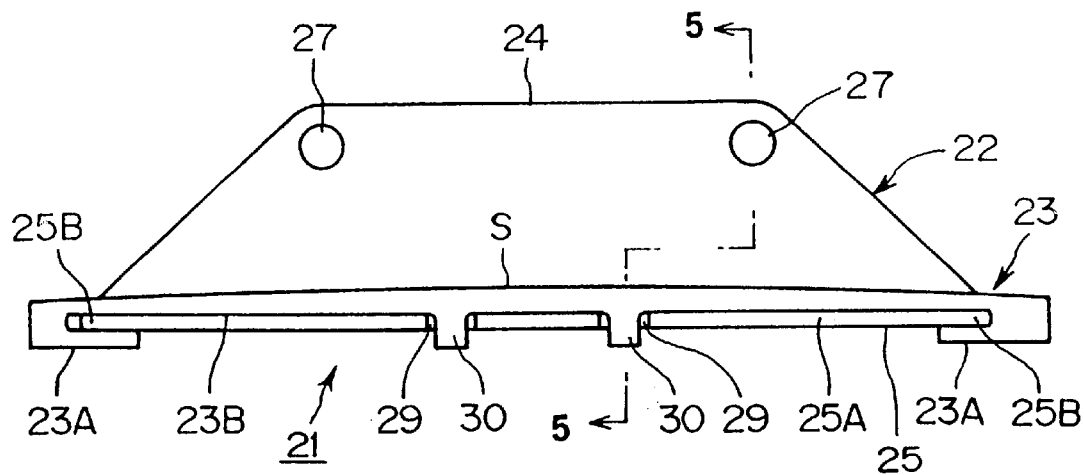
FIG. 5A
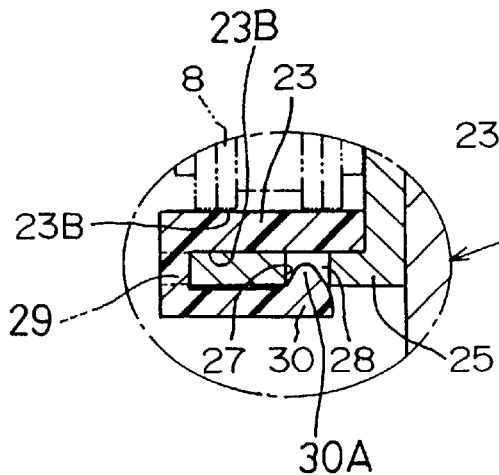
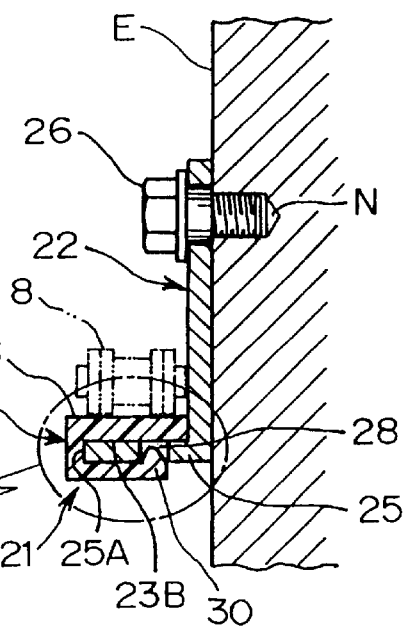

CHAIN GUIDE

BACKGROUND OF THE INVENTION

1. Field of the Invention

The present invention relates generally to a chain guide adapted to be mounted to a mount surface of an engine block, for example, for guiding the travel of a chain, and more particularly to an improvement in and relating to a joining structure between a guide shoe and a guide base of the chain guide.

2. Description of the Related Art

Conventionally, in a chain transmitting apparatus used in an automobile engine, as shown in FIG. 6 hereof, a chain A4 is trained around a drive sprocket A1 and two driven sprockets A2 and A3, and a chain guide A5 is disposed on an exterior side of a longitudinal portion of the chain A4 which constitutes a tension run (also called "tension side") of the chain A4.

The chain guide A5 has a function to suppress vibrations of the chain A4 while running, in cooperation with a tensioner device A6 which is disposed on the exterior side of a slack run (also called "slack side") of the chain A4 to remove a slack of the chain A4.

The conventional chain guide A5 is generally composed of a guide shoe A7 formed from a synthetic resin and having a shoe surface S adapted to be held in sliding contact with the rear surface of each plate P of the chain A4 (i.e., an outer circumferential surface of the chain A4), and a guide base A9 made of metal and firmly secured by a plurality of bolts A8 to a mount surface of an engine block, for example, of the automobile engine.

As shown in FIG. 7, the guide shoe A7 includes a plurality (two being shown) of pairs of hook-shaped locking prongs A10 arranged along opposite longitudinal edges of the guide shoe A7 at longitudinal intervals. The locking prongs A10 project perpendicularly from a rear surface of the guide shoe A7 which is opposite to the shoe surface S. The guide shoe A7 further has a pair of locking portions A11 and A12 provided at both longitudinal ends of the guide shoe A7 thereof (which correspond to a forward end and a backward end of the guide shoe A7 when viewed from the direction of travel of the chain A4, as shown in FIG. 6). The locking portions A11, A12 are engageable with forward and backward ends of the guide base A9.

The guide base A9 is made of metal and has a plurality of pairs of recessed portions A13 formed in opposite side surfaces (upper and lower surfaces) of the guide base A9 at a position corresponding to the position of the locking prongs A10 for receiving therein respective pairs of the locking prongs A10.

Mounting flanges A14 project from both longitudinal ends of the guide base A9 in a direction toward an inner circumferential surface of the chain A4 (FIG. 6). The mounting flanges A14 have bolt holes h formed at the same pitch as threaded holes (not shown) formed in the mount surface of the engine block. The bolts A8 extend through the holes h in the mounting flanges A14 and are threaded into the threaded holes in the mount surface to fasten the guide base A9 to the mount surface of the engine block, as shown in FIG. 6.

The conventional chain guide A5 of the foregoing construction is assembled as follows. While the locking prongs A10 of the guide shoe A7 are held in alignment with the corresponding recessed portions A13 of the guide base A9, the guide shoe A7 is pressed or forced toward the guide base A9. Forward movement of the guide shoe A7 relative to the guide base A9 causes the opposed locking prongs A10 to spread out against the resiliency thereof until front locking noses T (FIG. 8) of the locking prongs A10 move into a corresponding pair of recessed portions A13 of the guide base A9. Continuing forward movement of the guide shoe A7 causes the front locking noses T of the locking prongs A10 to project from a rear surface B of the guide base A9 whereupon the locking prongs A10 are allowed to spring back to restore their original shape. Thus, the locking noses T of the locking prongs A10 are interlocked with the rear surface B of the guide base A9 to thereby assemble together the guide shoe A7 and the guide base A9, as shown in FIG. 8. At the same time, the locking portions A12 (FIG. 7) provided at the forward and backward ends of the guide shoe A7 are brought into abutment with the forward and backward end faces of the guide base A9 to thereby position the guide shoe A7 relative to the guide base A9.

In the conventional chain guide A5 shown in FIGS. 6 through 8, since the mounting flanges A14 of the guide base A9 are bolted to the mount surface of the engine at a side adjacent to an inner circumferential surface of the chain A4, a free space defined by the inner circumferential surface of the chain A4 can be used efficiently.

However, since one locking prong of each pair of locking prongs A10 is inserted between the mount surface E (FIG. 8) and a lower surface of the guide block A9, it is practically impossible to integrate the two mounting flanges A14 into a single, relatively large mounting flange. Additionally, due to the presence of the recessed portions A13 formed in the guide base A9 for receiving therein the locking prongs A10 of the guide shoe A7, the guide base A9 is structurally weakened at such recessed portions and hence stiffness and rigidity of the guide base A9 are relatively low. Accordingly, while the chain A4 is traveling, the guide base A9 tends to vibrate in resonance with the chain A4, thus forming a source of undesired vibration and noises.

In view of the foregoing problem, an attempt has been made to provide a guide base with a single mounting flange designed to extend along the entire length of the guide base for the purpose of increasing the mechanical strength, stiffness and rigidity of the guide base. However, the prior attempt is not successful because the resultant mounting flange is disposed on an exterior side of the guide shoe. The mounting flange requires a large installation space provided on the exterior side of a path of travel of the chain, which will lead to enlargement of the overall size of the engine.

SUMMARY OF THE INVENTION

It is therefore an object of the present invention to provide a chain guide including structural features which can increase the mechanical strength, stiffness and rigidity of a chain guide to thereby reduce vibration and noises produced while a chain is running, and which enable compact accommodation of a mounting flange of the guide base within a space defined by an inner circumferential surface of the chain.

To attain the foregoing object, the present invention provides a chain guide for guiding an endless chain trained around a plurality of sprockets rotatably mounted on a fixed support member with a space defined between the chain and a mount surface of the fixed support member. The chain guide comprises a guide shoe having a shoe surface held in slide contact with an outer circumferential surface of the chain, and a guide base mounted to a mount surface of the fixed support member and supporting thereon the guide shoe. The guide base includes a single mounting portion bolted to the mounting surface of the fixed support member on an interior side of the endless chain and projecting to an exterior side of the endless chain through the space defined between the chain and the mounting surface, and a shoe supporting portion projecting from an end of the mounting portion located on the exterior side of the endless chain in a direction perpendicular to and away from the mounting surface and extending in a direction of travel of the chain. The shoe supporting portion has a plurality of locking edges spaced in the direction of travel of the chain and formed on a side of the shoe supporting portion facing away from the chain. The guide shoe has a rear surface opposite to the shoe surface and a plurality of resiliently deformable hook-shaped locking prongs formed on said rear surface. The locking prongs are interlocked with the locking edges of the guide base to secure the guide shoe to the guide base with the shoe supporting portion of the guide base being held between the rear surface and the hook-shaped locking prongs of the guide shoe.

When the guide shoe and the guide base are assembled together to form the chain guide of the foregoing construction, the guide shoe is pressed or forced over the shoe supporting portion of the guide base in the transverse direction of the shoe supporting portion until the resiliently deformable hook-shaped locking prongs of the guide shoe come into snap-fitting engagement with the locking edges of the shoe supporting portion to thereby secure the guide shoe to the guide base.

The mounting portion of the guide base is bolted to the mount surface of the fixed support member on an interior side of the looped chain in such a manner that the shoe surface of the guide shoe is held in sliding contact with the outer circumferential surface of the chain for guiding the chain.

The guide base composed or the mounting portion and the shoe supporting portion has a generally L-shaped cross section over the entire length thereof and has large mechanical strength, stiffness and rigidity. The guide base thus constructed is highly effective to prevent the occurrence of resonant vibration while the chain is running. Thus, vibration and noises produced during operation of the chain transmitting apparatus are considerably reduced.

In one preferred form, said shoe supporting portion of the guide base includes a plurality of nose locking projections formed on that side of said shoe supporting portion facing away from the chain. The nose locking projections are spaced in the direction of travel of the chain. The resiliently deformable hook-shaped locking prongs are snap-fitted with the nose locking projections, and the locking edges of the shoe supporting portion are formed at respective tip ends of the nose locking projections.

In another preferred form, the shoe supporting portion of the guide base has a plurality of apertures formed therein and spaced in the direction of travel of the chain. The resiliently deformable hook-shaped locking prongs are snap-fitted in the apertures, and the locking edges of the shoe supporting portion are formed by peripheral edges of the apertures opening at one end to that side of said shoe supporting portion which faces away from the chain. The base is preferably press-formed from a sheet metal.

The shoe supporting portion may further have a plurality of recessed portions spaced in the direction of travel of the chain. The recessed portions receive therein respective base portions of the hook-shaped locking prongs.

The guide shoe may further have a pair of generally L-shaped retaining portions projecting from a surface opposite to the shoe surface and retaining opposite longitudinal ends of said shoe supporting portion, respectively. By virtue of interlocking engagement between the retaining portions of the guide shoe and the opposite longitudinal ends of the shoe supporting portion, the guide shoe is stably held in position against movement relative to the guide base in the direction of travel of the chain and also against floating or separation of its longitudinal end portions from the shoe supporting portion.

BRIEF DESCRIPTION OF THE DRAWINGS

Certain preferred embodiments of the present invention will now be described in detail, by way of example only, with reference to the accompanying drawings, in which:

FIG. 2 is a plan view of the chain guide;

FIG. 3 is a cross-sectional view taken along line 3—3 of FIG. 2;

FIG. 3A is an enlarged view of a portion of FIG. 3;

FIG. 4 is view similar to FIG. 2, but showing a chain guide according to a second embodiment of the present invention;

FIG. 5 is a cross-sectional view taken along line 5—5 of FIG. 4;

FIG. 5A is an enlarged view of a portion of FIG. 5;

DETAILED DESCRIPTION OF THE PREFERRED EMBODIMENTS

The following description is merely exemplary in nature and is in no way intended to limit the invention or its application or uses.

Figure 1:
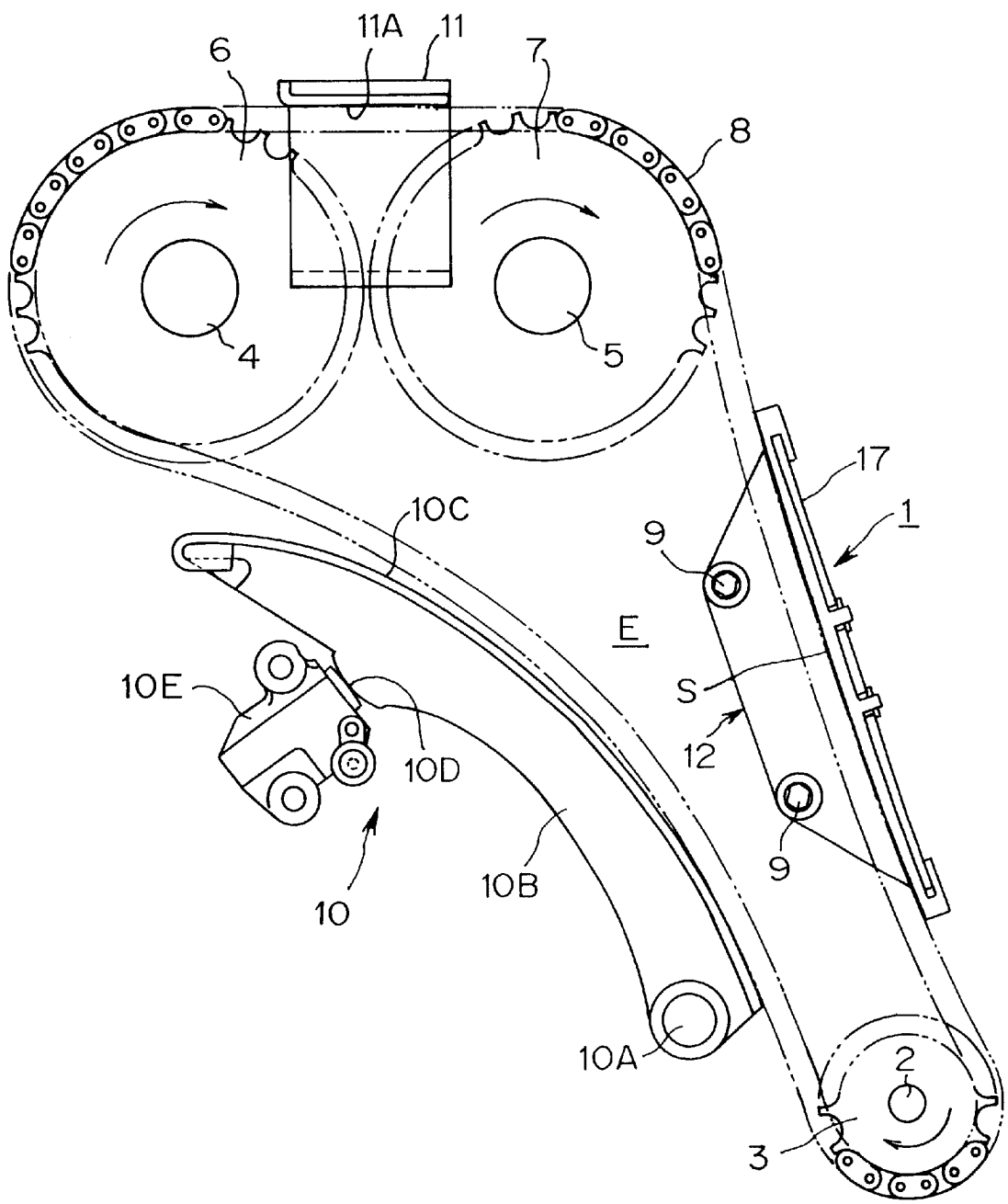
FIG. 1 is a view showing the general arrangement of a chain transmitting apparatus in which a chain guide according to a first embodiment of the present invention is incorporated.
Figure 6:
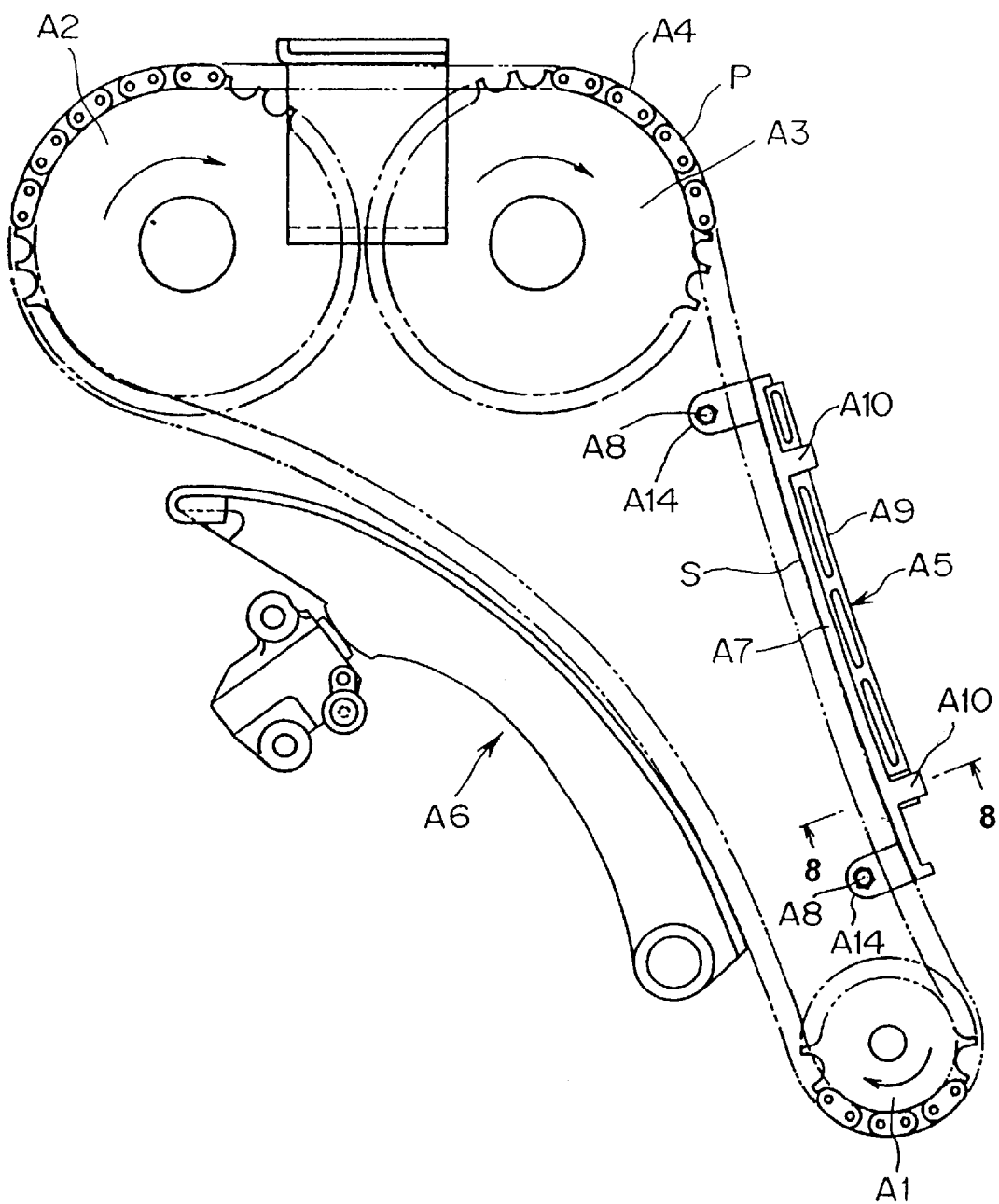
FIG. 6 is a view showing the general arrangement of a chain transmitting apparatus in which a conventional chain guide is incorporated.
Figure 7:
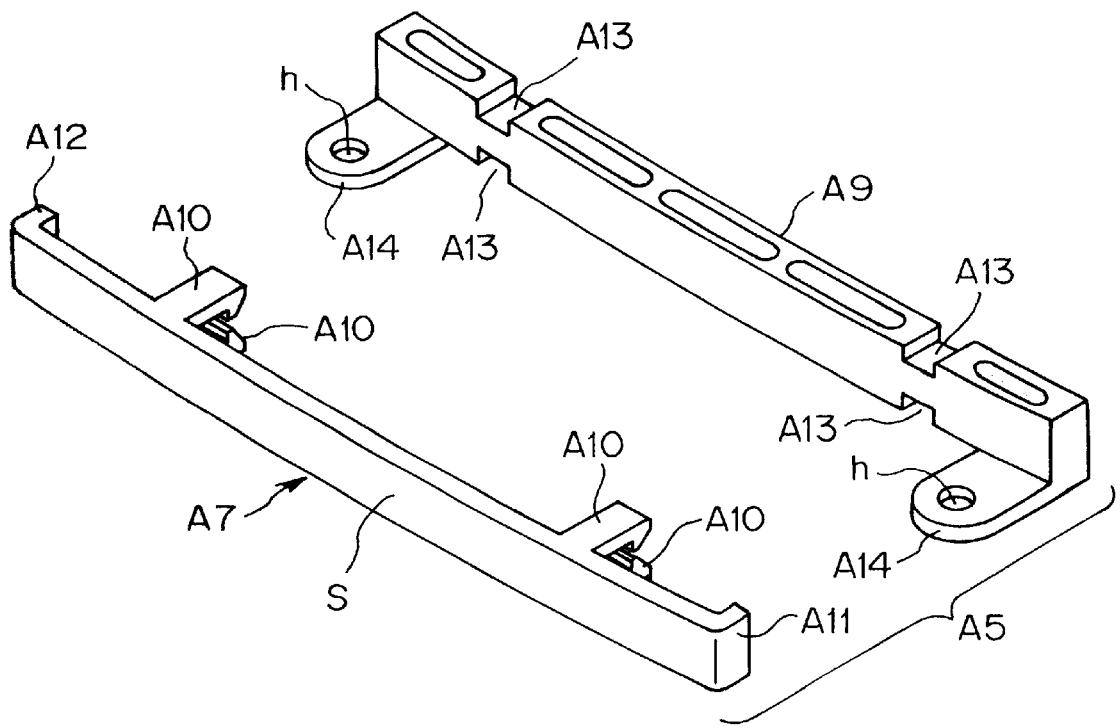
FIG. 7 is an exploded perspective view of the conventional chain guide.
Figure 8:
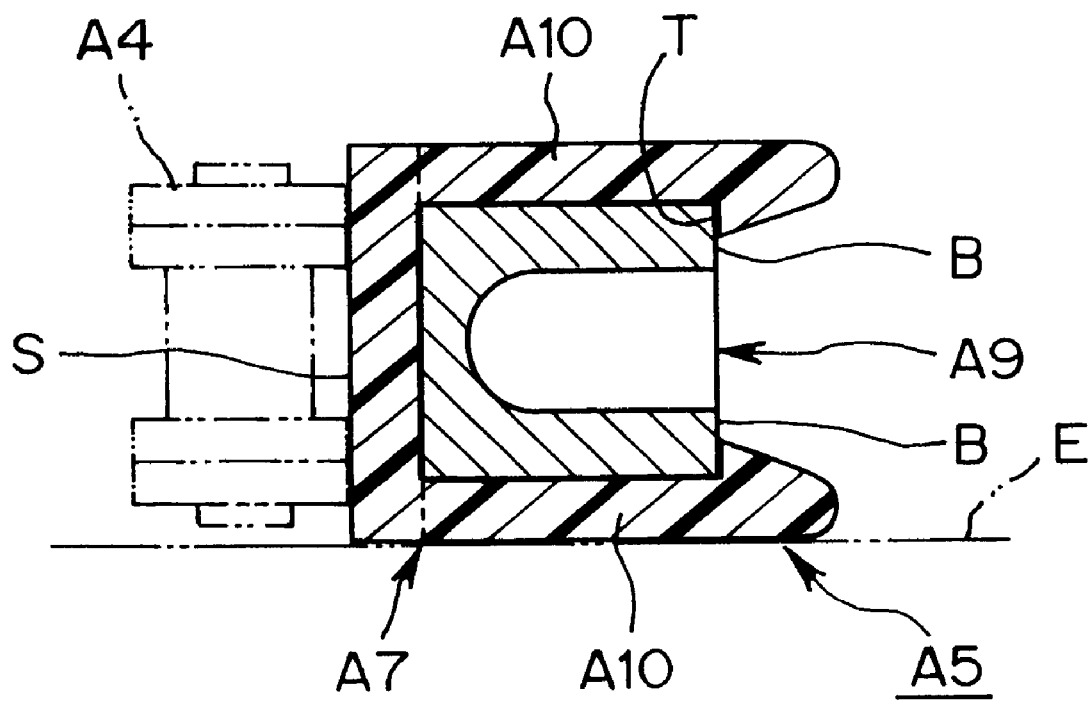
FIG. 8 is a cross-sectional view taken along line 8—8 of FIG. 6.

Referring to FIG. 1, there is shown a chain transmitting apparatus in which a chain guide 1 according to a first embodiment of the present invention is incorporated. The chain transmitting apparatus includes a chain 8 trained around a drive sprocket 3 secured to a crankshaft 2 of an automobile engine (not designated) and first and second driven sprockets 6 and 7 secured to first and second camshafts 4 and 5 of the engine. The chain guide 1 is firmly secured by bolts 9 to a mount surface E of an engine block on an exterior side of a tension run (also called "tension side") of the chain 8 extending between the drive sprocket 3 and the second driven sprocket 7.

The chain 8 transmits rotation of the drive sprocket 3 co-rotating with the crankshaft in a direction of the arrow to the driven sprockets 6, 7 to thereby rotate the camshafts 4, 5 in the same direction in synchronism with rotation of the crankshaft 2.

A tensioner device 10 is mounted to the mount surface E of the engine block on the exterior side of a slack run (also called "slack side") of the chain 8 extending between the drive sprocket 3 and the first driven sprocket 6.

The tensioner device 10 is comprised of a tensioner lever 10B pivotally supported on a support axle 10A secured to the mount surface E, and a tensioner 10E including a plunger 10D acting on the tensioner lever 10B to urge a shoe surface 10C of the tensioner lever 10B against an outer circumferential surface of the chain 8 to thereby take up or remove a slack of the chain 8.

An auxiliary guide 11 is disposed on the exterior side of a chain run extending between the first and second driven sprockets 6, 7. The auxiliary guide 11 has a shoe surface 11A held in sliding contact with the outer circumferential surface of the chain 8 to guide the travel of the chain.

As shown in FIGS. 2 and 3, the chain guide 1 is composed of a guide base 12 die-cast from a metal and a guide shoe 13 molded from a synthetic resin.

The guide base 12 includes a flat, elongated mounting portion 15. The mounting portion 15 has a generally trapezoidal shape when shown in a plan view. The mounting portion 15 has two bolt holes 14 aligned with each other in the longitudinal direction of the mounting portion 15. The bolts 9 (FIGS. 1 and 3) each comprised of a shouldered bolt extend through the holes 14 and are threaded into threaded holes N (FIG. 3) formed in the mount surface E of the engine block on the interior side of the chain 8.

The mounting portion 15 has two annular bosses 16 formed along peripheral edges of the bolt holes 14 opening at one end to a front surface of the mounting portion 15. The bosses 16 guidedly receive therein respective shoulder portions 9A of the shouldered bolts 9.

In the illustrated embodiment, since due to the provision of the bosses 16, the axial length of the bolt holes 14 is made larger than the thickness of the mounting portion 15, it becomes possible to provide an elastic collar (not shown) inserted between each of the bolt holes 14 and the shoulder portion 9A of the corresponding bolt 9. The collar is made of a cushioning material such as vibration proof rubber so as to isolate transmission of vibration between the guide shoe and the engine block.

The guide base 12 also includes a shoe supporting portion 17 integrally formed with a base or longer side of the trapezoidal mounting portion 15. The shoe supporting portion 17 projects substantially perpendicularly from the front surface of the mounting portion 15 and is elongated in the direction of travel of the chain 8.

The guide base 12 formed with the mounting portion 15 and the shoe supporting portion 17 has a generally L-shaped cross section and hence possesses high mechanical strength, stiffness and rigidity. Thus, the guide base 12 is highly resistant to bending forces and twisting forces.

The shoe supporting portion 17 has a plurality (two in the illustrated embodiment) of locking edges 18A (FIGS, 3 and 3A) formed on a surface 17C which faces in a direction away from the inner circumferential surface of the chain 8. The locking edges 18A are spaced at intervals in a direction parallel to the direction of travel of the chain 8. Each of the locking edges 18A is formed at a tip end of a nose locking projection 18 protruding from the surface 17C. The nose locking projection 18 has a sloped guide surface 18B (FIG. 3A) tapering from the locking edge 18A toward a longitudinal edge 17A of the shoe supporting portion 17 which is located at a distal end (fore end) of the shoe support portion 17.

The longitudinal edge 17A of the shoe supporting portion 17 has plural cutout or recessed portions 19 (FIGS. 2 and 3A) formed at a position corresponding to the position of the locking edges 18A for a purpose described later.

The guide shoe 13 has an elongated body and is made somewhat longer than the length of the shoe supporting portion 17 in the direction of travel of the chain 8. The guide shoe 13 has a shoe surface S held in sliding contact with the outer circumferential surface of the chain 8 for guiding the chain 8. To this end, the guide shoe 13 is detachably assembled with the shoe supporting portion 17 with the shoe surface S directed toward the bolt holes 14 of the guide base 12, as shown in FIG. 2.

The guide shoe 13 further has a pair of generally L-shaped retaining portions 13A, 13A (FIG. 2) located at opposite longitudinal ends of the guide shoe 13 and projecting from a rear surface 13B of the guide shoe 13 in such a manner that the L-shaped retaining portions 13A face each other with a space defined therebetween. When the guide shoe 13 is attached to the shoe supporting portion 17, opposite longitudinal end edges 17D of the shoe supporting portion 17 are stably held or retained by the L-shaped retaining portions 13A. Thus, the guide shoe 13 is stably held in position against movement relative to the guide base 12 in the longitudinal direction equal to the chain travel direction. The interlocking engagement between the retaining portions 13A and the longitudinal end edges 17D of the shoe support portion 17, the guide shoe 13 is surely prevented from floating or separating at its opposite longitudinal end portions from the shoe supporting portion 17.

The guide shoe 13 has a plurality (two in the illustrated embodiment) of hook-shaped locking prongs 20 formed on the rear surface 13B. The locking prongs 20 are resiliently deformable and snap-fit with the nose projections 18 to engage the locking edges 18A of the shoe supporting portion 17. Each of the locking prongs 20 has a locking projection 20A (FIG. 3A) protruding from a free end of the locking prong 20 toward the rear surface 13B of the guide shoe 13.

For assembling the chain guide 1 of the foregoing construction, the guide shoe 13 is pressed or forced toward the guide base 12 in the widthwise or transverse direction of the shoe supporting portion 17 in such a manner that the shoe supporting portion 17 is received between the rear surface 13B of the guide shoe 13 and the hook-shaped locking prongs 30 while the opposite longitudinal end edge portions 17D of the shoe supporting portion 17 are guided by the L-shaped retaining portions 13A of the guide shoe 13.

During that time, the locking prongs 20 are resiliently deformed or flexed outward away from the rear surface 13B as they move on the sloped guide surfaces 18B (FIG. 3A) toward the tip ends of the nose locking projections 18. Continuing advancing movement of the locking prongs 20 causes the locking projections 20A to move past the tip ends of the locking projections 18 whereupon the locking prongs 20 are allowed to spring back and restore their original shape. Thus, the locking projections 20A are brought into interlocking engagement with the locking edges 18A of the shoe supporting portion 17. In this instance, a proximal end portion (base portion) of each of the hook-shaped locking prongs 20 is received in a corresponding one of the recessed portions 19 of the shoe supporting portion 17, and the opposite longitudinal end edges 17D of the shoe supporting portion 17 are stably held or retained by the L-shaped retaining portions 13A of the guide shoe 13. The guide shoe 13 is thus attached to the guide base 12 to thereby produce an assembled chain guide 1.

The thus assembled chain guide 1 is attached by the bolts 9 to the mount surface E of the engine block in such a manner that the shoe surface S of the guide shoe 13 is in slide contact with the outer circumferential surface of the chain 6.

In the case where the chain transmitting apparatus includes a mechanism for enabling loosening of the chain 8 or the chain 8 is trailed around the sprockets 3, 6, 7 after the mounting of the chain guide 1 has completed, an assembling process may be achieved such that the guide base 12 is solely attached to the mount surface E, then the guide shoe 12 is attached to the guide base 13.

When the shoe surface S of the guide shoe 13 has worn away due to continuous use, the guide shoe 13 can readily be detached from the guide base 12 by releasing the locking prongs 20 from interlocking engagement with the locking edges 18A of the shoe supporting portion 17 by using a suitable tool such as a screwdriver.

FIGS. 4 and 5 show a chain guide 21 according to a second embodiment of the present invention. The chain guide 21 is comprised of a guide base 22 press-formed from a sheet metal such as a steel plate, and a guide shoe 23 molded from a synthetic resin. The guide shoe 23 is structurally the same as the guide shoe 13 of the first embodiment shown in FIGS. 1 and 2.

Like the guide base 12 in the first embodiment, the guide base 22 includes a flat, elongated mounting portion 24 of a generally trapezoidal shape, and a shoe supporting portion 25 formed integrally with a base or longer side of the trapezoidal mounting portion 24 and bent at right angles to the mounting portion 24. The shoe supporting portion 25 projects substantially perpendicularly from the front surface of the mounting portion 24 and extends along the direction of travel of the chain 8.

The mounting portion 24 has two bolt holes 27 aligned with each other in the longitudinal direction of the elongated mounting portion 24. Two bolts 26 (one being show in FIG. 5) extend through the bolt holes 27 and are threaded into threaded holes N (FIG. 5) formed in the mount surface E of the engine block. The guide base 22 is press-formed from a single sheet metal. In the manufacture of the guide base 22, the sheet metal is stamped into a succession of guide base blanks, and the guide base blanks are bent into an L shape. The mounting portion 24 has no annular bosses formed along respective peripheral edges of the bolt holes 27, and so the length of the shouldered bolts 26 is smaller than that of the shouldered bolts 9 used in the first embodiment shown in FIGS. 1–3.

The guide base 22 has a plurality (two in the illustrated embodiment) of locking edges 27 (FIG. 5A) each formed by a peripheral edge of an aperture or hole 28 opening at one end to a surface of the shoe supporting portion 25 which faces away from the inner circumferential surface of the chain 8. In the illustrated embodiment, the aperture 28 takes the form of a through-hole extending across the thickness of the shoe supporting portion 25. A longitudinal edge 25A of the shoe supporting portion 25 which is located at a distal end (fore end) of the shoe support portion 25 has a plurality of recessed portions 29 (FIGS. 4 and 5A) formed at a position corresponding to the position of the locking edges 27 for a purpose described below.

The guide shoe 23 has a pair of generally L-shaped retaining portions 23A, 23A located at opposite longitudinal ends of the guide shoe 23. The retaining portions 23A have the same shape and function as the retaining portions 13A of the first embodiment shown in FIGS. 1–3. The guide shoe 23 has a shoe surface S held in sliding contact with the outer circumferential surface of the chain 8, and a rear surface 23B opposite to the shoe surface S and facing in a direction away from the inner circumferential surface of the chain. The guide shoe 23 further has a plurality (two in the illustrated embodiment) of hook-shaped locking prongs 30 formed on the rear surface 25B and being snap-fitted in the apertures (through-holes) 28 of the shoe supporting portion 25. Each of the locking prongs 30 has a locking prong 30A (FIG. 5A) protruding from a free end of the locking prong 30 toward the rear surface 23B of the guide shoe 23. The locking projection 30A is interlocked with the peripheral edge 27 of the aperture 28 formed in the shoe supporting portion 25.

For assembling the chain guide 21 of the foregoing construction, the guide shoe 23 is pressed or forced toward the guide base 22 in the transverse direction of the shoe supporting portion 25 in such a manner that the shoe supporting portion 25 is inserted between the rear surface 23b of the guide shoe 23 and the hook-shaped locking prongs 30 while the opposite longitudinal end edges 25B of the shoe supporting portion 25 are guided by the L-shaped retaining portions 23A of the guide shoe 23. During that time, the hook-shaped locking prongs 30 are resiliently deformed or flexed outward away from the rear surface 23b of the guide shoe 23 as the locking projections 30A move onto a surface of the shoe supporting portion 25. As the locking prongs 30 further advance, the locking projections 30A are caused to move past the peripheral edges (locking edges) 27 of the apertures 28 whereupon the locking prongs 30 are allowed to spring back and restore their original shape, thus coming into snap-fitting engagement with the apertures 28. In this instance, the locking projections 30A are brought into interlocked engagement with the locking edges 27 of the apertures 28 so that the guide shoe 23 is firmly attached to the shoe support portion 25 of the guide base 22.

At the same time, a proximal end portion (base portion) of each of the hook-shaped locking prongs 30 is received in a corresponding one of the recessed portions 29 of the shoe supporting portion 25, and the opposite longitudinal end edges 25B of the shoe supporting portion 25 are stably held or retained by the L-shaped retaining portions 23A of the guide shoe 23. The guide shoe 23 and the guide base 12 thus assembled together form a chain guide.

Although in the embodiments described above the locking prongs of the guide shoe and the locking edges of the guide base are provided in two sets, three or more sets of locking prongs and locking edges can be used.

The recessed portions of the shoe supporting portion may be designed to snugly receive therein respective base portions of the hook-shaped locking prongs, in which instance since the guide shoe is locked in position against movement in the chain travel direction relative to the guide base, the L-shaped retaining portions of the guide shoe can be omitted.

Alternately, in the case where movement of the guide shoe in the chain travel direction relative to the guide base is surely prevented by the L-shaped retaining portions of the guide shoe, the recessed portions of the shoe supporting portion can be omitted.

Application of the chain guide of the present invention should by no means be limited to the chain transmitting apparatus for automobile engines as in the illustrated embodiments but may include a variety of power transmitting apparatus in which a roller chain or a silent chain is used.

As described above, in the chain guides of the present invention, the guide base composed of a mounting portion and a shoe supporting portion has a generally L-shaped cross section substantially over the entire length of the guide chain. The guide shoe is fitted over the shoe supporting portion from a distal end of the shoe support portion of the L-shaped guide base. The L-shaped or angle-like guide base is simple in construction and strong enough to withstand bending and twisting forces which may be applied to the guide base while the chain is running. The mounting portion of the guide base is disposed on the interior side of the looped chain so that it does not increase the overall size of the engine block to which the chain guide is mounted.

The angle guide base is highly rigid and does not undergo vibration in resonance with the chain. Accordingly, vibration and noises produced during operation is considerably reduced.

The angle guide base may be press-formed from a sheet metal. The press-formed guide base can be produced at a low cost and hence lowers the manufacturing cost of the chain guide.

The guide shoe attached to the guide base through interlocking engagement between the locking prongs and the locking edges is stably held in position against movement in the direction of travel of the chain by means of the L-shaped retaining portions provided at opposite longitudinal ends of the guide shoe for holding opposite longitudinal end edges of the shoe supporting portion of the guide base. Engagement between the retaining portions and the opposite longitudinal end edges prevents the opposite longitudinal ends of the guide shoe from floating or separating from the shoe supporting portion.

Obviously, various minor changes and modifications of the present invention are possible in the light of the above teaching. It is therefore to be understood that within the scope of the appended claims, the present invention may be practiced otherwise than as specifically described.

What is claimed is:

1. A chain guide for guiding an endless chain trained around a plurality of sprockets rotatably mounted on a fixed support member with a space defined between the chain and a mount surface of the fixed support member, said chain guide comprising:

a guide shoe having a shoe surface held in slide contact with an outer circumferential surface of the chain; and a single guide base mounted to a mount surface of the fixed support member and supporting thereon said guide shoe, wherein said guide base includes a mounting portion bolted to the mounting surface of the fixed support member on an interior side of the endless chain and projecting to an exterior side of the endless chain through the space defined between the chain and the mounting surface, and a shoe supporting portion projecting from an end of the mounting portion located on the exterior side of the endless chain in a direction perpendicular to and away from the mounting surface, said shoe supporting portion being elongated in a direction of travel of the chain and having a first side facing the chain, and a second side facing away from the chain;

wherein said shoe supporting portion has a plurality of locking edges spaced in the direction of travel of the chain and formed only on said second side; and wherein said guide shoe has a rear surface opposite to said shoe surface and a plurality of resiliently deformable hook-shaped locking prongs formed on one side edge only of said rear surface, and locking prongs being interlocked with said locking edges of said guide base to secure said guide shoe to said guide base with said shoe supporting portion of the guide base being held between said rear surface and said hook-shaped locking prongs of said guide shoe.

2. A chain guide according to claim 1, wherein said shoe supporting portion of said guide base includes a plurality of nose locking projections formed on said side of said shoe supporting portion and spaced in the direction of travel of the chain, said resiliently deformable hook-shaped locking prongs are snap-fitted with said nose locking projections, and said locking edges of said shoe supporting portion are formed at respective tip ends of said nose locking projections.

3. A chain guide according to claim 1, wherein said shoe supporting portion of said guide base has a plurality of apertures formed therein and spaced in the direction of travel of the chain, said resiliently deformable hook-shaped locking prongs are snap-fitted in said apertures, and said locking edges of said shoe supporting portion are formed by peripheral edges of said apertures opening at one end to said side of said shoe supporting portion.

4. A chain guide according to claim 3, wherein said guide base is press-formed from a sheet metal.

5. A chain guide according to claim 1, wherein said shoe supporting portion further has a plurality of recessed portions spaced in the direction of travel of the chain, and said hook-shaped locking prongs each have a base portion received in a corresponding one of said recessed portions of said shoe supporting portion.

6. A chain guide according to claim 1, wherein said guide shoe further has a pair of generally L-shaped retaining portions projecting from a surface opposite to said shoe surface and retaining opposite longitudinal ends of said shoe supporting portion, respectively.

* * * * *